(12) United States Patent
Hutchinson et al.

(10) Patent No.: US 6,597,487 B2
(45) Date of Patent: Jul. 22, 2003

(54) DIELECTRIC WAVEGUIDE GAS-FILLED STARK SHIFT MODULATOR

(75) Inventors: Donald P. Hutchinson, Knoxville, TN (US); Roger K. Richards, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/007,180

(22) Filed: Nov. 5, 2001

(65) Prior Publication Data

US 2003/0086633 A1 May 8, 2003

(51) Int. Cl.[7] ............................. G02F 1/00; G02F 1/365
(52) U.S. Cl. ....................... 359/237; 359/334; 385/122
(58) Field of Search .................. 359/237, 295, 359/296, 276, 333, 334, 341.31, 249; 257/22, 50; 385/1–3, 122, 131

(56) References Cited

U.S. PATENT DOCUMENTS

| | | | |
|---|---|---|---|
| 3,806,834 A | | 4/1974 | Johnston et al. ............ 359/276 |
| 3,842,372 A | | 10/1974 | Pao et al. |
| 3,889,182 A | * | 6/1975 | Easley et al. ............... 333/110 |
| 4,063,195 A | * | 12/1977 | Abrams et al. ............. 385/132 |
| 4,085,387 A | | 4/1978 | Asawa et al. ................ 272/20 |
| 4,656,439 A | | 4/1987 | Wessel |
| 4,777,457 A | * | 10/1988 | Ghosh et al. ................ 257/17 |
| 6,301,041 B1 | * | 10/2001 | Yamada ....................... 359/333 |
| 2002/0173780 A1 | * | 11/2002 | Altshuler et al. .............. 606/9 |

OTHER PUBLICATIONS

Nubling, Rick, K. entitled "Launch Conditions and Mode Coupling in Hollow–Glass Waveguides" Opt. Eng. 37(9) (Sep. 1998); pp. 2454–2458.

Mei et al., "Strain–compensated InAsP/GaInP multiple quantum wells for 1.3 $\mu$m waveguide modulators," Applied Physics Letters, 68:90–92, 1996.

Nubling et al., "Launch conditions and mode coupling in hollow–glass waveguides," Society of Photo–Optical Instrumentation Engineers, 37:2454–2458, 1998.

* cited by examiner

*Primary Examiner*—Georgia Epps
*Assistant Examiner*—Omar Hindi
(74) *Attorney, Agent, or Firm*—Akerman Senterfitt (57) ABSTRACT

An optical modulator includes a dielectric waveguide for receiving an optical beam and coupling energy of the optical beam into the waveguide. At least one Stark material is provided in the waveguide. A bias circuit generates a bias signal to produce an electrical field across the Stark material to shift at least one of the Stark absorption frequencies towards the frequency of the optical beam. A circuit for producing a time varying electric field across the Stark material modulates the optical beam. At least a portion of the bias field can be generated by an alternating bias signal, such as a square wave. A method of modulating optical signals includes the steps of providing a dielectric waveguide for receiving an optical beam and coupling energy of the optical beam into the waveguide, the waveguide having at least one Stark material disposed therein, and varying an electric field imposed across the Stark material.

38 Claims, 8 Drawing Sheets

DIELECTRIC WAVEGUIDE GAS-FILLED STARK SHIFT MODULATOR

STATEMENT REGARDING FEDERALLY SPONSORED RESEARCH OR DEVELOPMENT

The United States Government has rights in this invention pursuant to Contract No. DE-AC05-OOOR22725 between the United States Department of Energy and UT-Battelle, LLC.

FIELD OF THE INVENTION

This invention relates generally to optical modulators, and more particularly to Stark effect modulators.

BACKGROUND OF THE INVENTION

Modulation of a laser beam using the Stark effect generally utilizes a cell containing a confined gas having a molecular absorption resonance at or near the output frequency of the laser. The resonance can be frequency (or considered to be wavelength) tuned to become nearly coincident with the laser frequency by generation of a suitable electric field from application of a DC voltage across the Stark gas contained in the Stark cell.

Stark cell type modulation of optical (e.g. laser) beams generally utilize gaseous materials which have an absorption resonance at the laser frequency when the material is acted upon by an electric field. This effect occurs in both visible and infrared laser beams, but the process is most efficient with infrared lasers, such as $CO_2$ lasers, or the like.

Most commonly applied to gases, the Stark effect involves the application of an electric field to a suitable material, the material having a substantial polarization. For example, varying the applied electric field results in changing the energy spacing of the molecular levels of the Stark material. The energy spacing changes the frequency or wavelength that is absorbed by the Stark material (e.g. Stark gas). The energy spacing of the Stark material is generally very small compared to the energy of the optical photons which interact with the Stark material. Application of an AC modulation signal in addition to an appropriate DC bias allows for modulation of the laser beam at the AC modulation frequency.

Stark effect modulation of laser energy is generally well known and described in numerous texts, articles and patents. For light having a wavelength of 9–11 $\mu$m, which can be provided by a $CO_2$ laser, an efficient molecule for Stark modulation is known to be ammonia ($NH_3$ and its isotopes) due to its large Stark coefficient and strong absorption amplitude. This technique relies on a near coincidence in wavelength (or frequency) between at least one of the plurality of lines emitted by the $CO_2$ laser and one of the absorption frequencies of the ammonia molecule. A modulation signal producing a time varying electric field is used to slightly change the ammonia absorption resonance into and out of coincidence with the laser beam frequency producing amplitude modulation by absorption.

Examples of Stark modulators for a $CO_2$ lasers include U.S. Pat. No. 3,806,834 to Johnston et al. entitled "Stark Effect Modulation of $CO_2$ Laser with $NH_2D$" and U.S. Pat. No. 4,085,387 to Asawa et al. entitled "Stark-tuned Laser Modulator". Asawa et al. discloses modulation of $C^{13}O_2$ laser light at 10:73 $\mu$m and 10.78 $\mu$m with $NH_3$, while Johnston et al. discloses modulation of $C_{12}O_2$ laser light at approximately 10.6 $\mu$m with $NH_2D$, where D is deuterium, an isotope of hydrogen.

Stark cells described in both these patents and other available Stark modulators use free space propagation of the optical beam through the Stark modulator cell. Such modulators are constructed from two parallel electrodes separated by a distance, the separation distance being much smaller than the electrode width to minimize the variation of electrical field across the optical (e.g. laser) beam.

Conventional Stark cell designs use electrodes spaced 2 to 3 mm apart, the electrodes being approximately 30 to 40 mm in length, or more. Since Stark cell length is approximately proportional to the degree of modulation provided, practical Stark cells generally require significant modulation lengths, often being hundreds of centimeters long. Electrode spacing is a parameter requiring a tradeoff for conventional Stark designs. Too small an electrode spacing results in excessive beam vignetting, while the necessary voltage to produce the required electric field intensity to align the desired Stark line with the incident laser beam increases as the electrode spacing increases.

Electrodes in conventional Stark cells are positioned within a vacuum enclosure, the vacuum enclosure filled with a Stark gas. As noted, these designs result in the loss of light within the modulator caused by vignetting of the optical beam by the exposed electrodes. In addition, such designs result in relatively slow modulation speed due to the high electrical capacitance and large voltages necessary for practical modulation efficiencies. High electrical capacitance results in part from the electrode plates being wider than the width of the incident laser beam to help provide a more uniform electric field throughout the modulation region.

Figure 1:
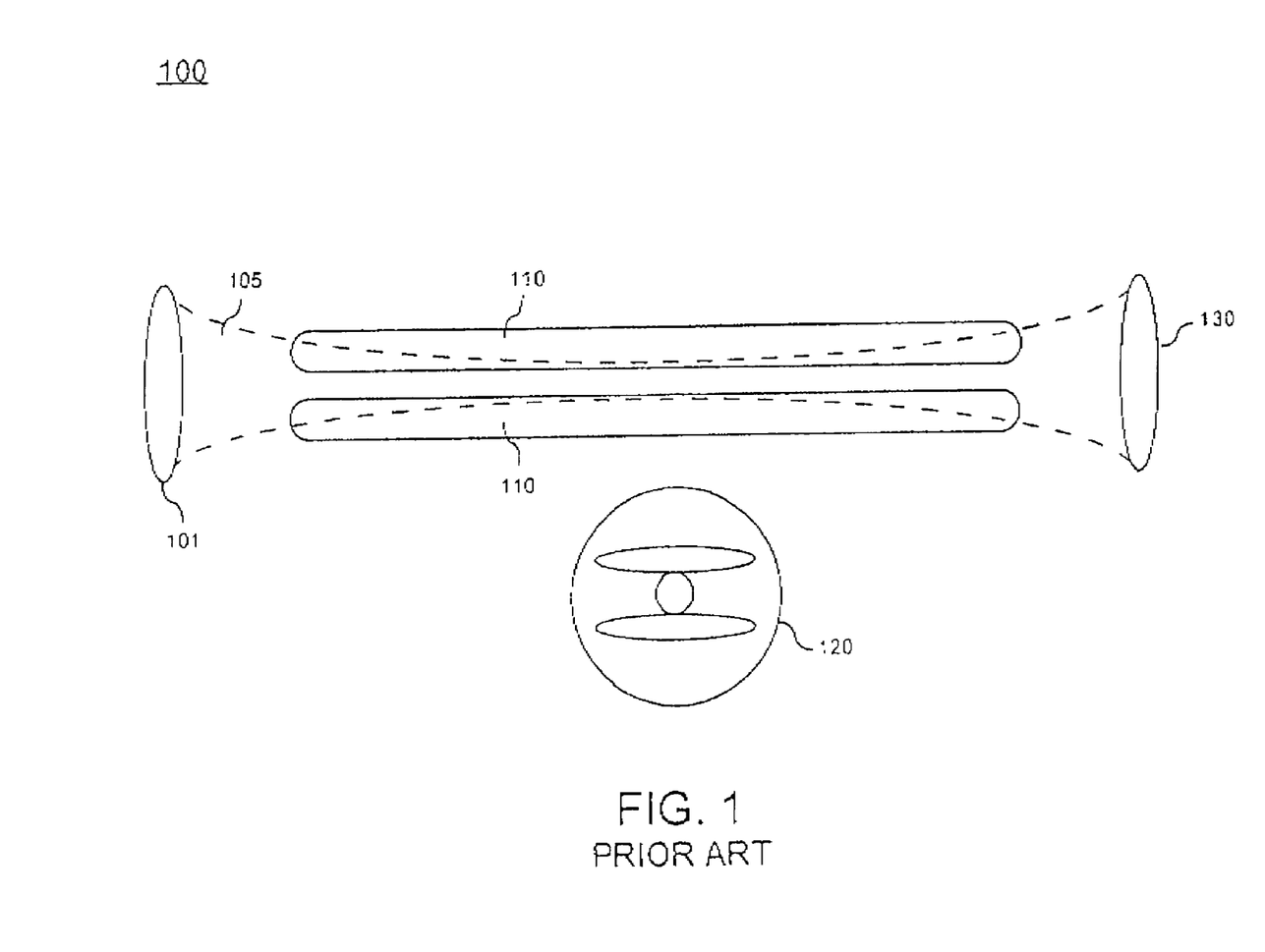
FIG. 1 illustrates a conventional Stark cell design which uses free space laser propagation through the Stark cell.

A sketch of a conventional Stark cell modulator 100 is shown in FIG. 1. An optical beam 105, after being focused by lens 101, passes between parallel electrode plates 110 and 112. Vignetting of beam 105 by electrode plates 110 and 112 is shown by beam 105 overlapping electrodes 110 and 112 as the beam passes through the length of Stark cell 100. The output of Stark cell 100 is shown directed to a second lens 130. As shown in the inset, a vacuum enclosure 120 having suitable end windows (not shown) is provided to seal the Stark gas within the modulator 100.

Modulator 100 results in significant loss of light transmission through its length caused by vignetting of the optical beam (dotted line) by the exposed electrodes. It is difficult to focus long-wavelength infrared beams on the order of 10 $\mu$m to form a small beam over a sufficiently long distance to avoid significant optical attenuation by the exposed electrode structure. Typically, these devices have been constructed for operation at low (audio) frequencies primarily for frequency stabilization of the laser in physics studies of the Stark effect itself. In addition to the optical loss caused by the electrodes, the long, wide, closely spaced electrodes have substantial electrical capacitance, preventing high frequency modulation and the ability to optically transmit data at high data rates.

SUMMARY OF THE INVENTION

An optical modulator includes a dielectric waveguide for receiving an optical beam and coupling energy of the optical beam into the waveguide, the optical beam being at a first frequency. At least one Stark material is disposed in the waveguide, the Stark material having at least one absorption frequency that is electrostatically tunable within a range of frequencies. The range of frequencies includes the first frequency. A bias circuit for generation of a bias electrical field across the Stark material is provided to shift at least one of the absorption frequencies towards the first frequency. A circuit is also provided for producing a time varying electrical field across the Stark material. The time varying field is adapted to shift at least one of the absorption frequencies towards the first frequency and away from the first frequency.

The bias field can have alternating field component and the alternating field component can be generated by a square wave signal. The alternating field component preferably has a frequency sufficient to switch polarity faster than the rate of charge build-up which can occur on the walls of the waveguide. The bias circuit can include two amplifiers, the bias amplifiers configured to produce outputs having opposite polarities in response to a given input signal. The circuit for producing a time varying signal can also include two high frequency amplifiers, the high frequency amplifiers configured to produce outputs having opposite polarities in response to a given input signal. A structure for synchronizing the polarity of the time varying electrical field with the alternating field component can also be provided.

The optical modulator can include conductive electrodes disposed on the outside of the waveguide. Thus, the waveguide isolates the optical beam from the electrodes. A $CO_2$ laser can be provided for producing the optical beam, the Stark material preferably being ammonia. Ammonia can provide an enhanced concentration of deuterated ammonia ($NH_2D$)

The waveguide can have a bore size of less than 1.0 mm. The modulator is efficient. Substantially all incident power of the optical beam can be coupled into an $HE_{11}$ mode in the waveguide, such as at least 90%. The optical beam can be linearly polarized and oriented perpendicular with respect to the applied electrical fields. The waveguide can be quartz for a quartz waveguide, an alternating field component frequency is preferably at least 100 Hz.

The circuit for producing a time varying electrical field can generate at least one analog data component. The analog data component can be a chirped signal, the chirped signal varying over a frequency range. Analog data can be transmitted with the optical beam by variation of optical beam parameters such as amplitude, phase and frequency. The analog data component can include a plurality of sub-carriers, the plurality of sub-carriers multiplexed onto the optical beam, where each of the sub-carriers provide analog information.

The circuit for producing a time varying electrical field can generate at least one digital data component. The digital data component can include comprises a plurality of sub-carriers, the plurality of sub-carriers being multiplexed onto the optical beam, where each sub-carrier can provide digital information.

The modulator can be used in a variety of systems. For example, the invention can be used for a free-space optical link, laser radar, chemical detection, target illumination and active illumination for infrared imaging.

A method for modulating optical signals includes the steps of providing a dielectric waveguide for receiving an optical beam and coupling energy of the optical beam into the waveguide. The waveguide has at least one Stark material disposed therein, the Stark material having at least one absorption frequency that is electrostatically tunable within a range of frequencies. The optical beam is coupling into the waveguide, the optical beam being at a first frequency. The first frequency is within the range of frequencies. An electric field including a time varying field portion is applied across the Stark material. As a result, the optical beam output by the waveguide is modulated by the time varying portion of the electrical field.

The optical beam can be is provided by a $CO_2$ laser and the Stark material can be ammonia. The ammonia preferably comprises ammonia having an enhanced concentration of deuterated ammonia ($NH_2D$) The coupling step can be difficult. For example, substantially all incident power of the optical beam can be coupled into an $EH_{11}$ mode in the waveguide, such as at least 90%.

The method can include the step of providing a bias field across said Stark material, where at least a portion of the bias field has an alternating field component. An alternating field component can be generated by a square wave signal. The alternative field component preferably has a frequency sufficient to switch polarity faster than the rate of charge build-up on the walls of the waveguide. Preferably, the waveguide is quartz and the frequency of the alternating field component is at least 100 Hz.

Substantially all of the bias field can be an alternating field. The bias field can be generated by a differential signal, the components of the differential signal having opposite polarities. Preferably, the polarity of the time varying electrical field is synchronized with the alternating field component. Time varying electrical field portion can be generated by at least one analog data signal. The analog data signal can be transmitted with the optical beam using variation of at least one optical beam parameter, such as amplitude, phase and/or frequency.

The analog data signal can include a plurality of sub-carriers. The sub-carriers can be multiplexed onto the optical beam, with each of the sub-carriers providing analog information. The time varying portion can be generated by at least one digital data signal. The digital data signal can include a plurality of sub-carriers. The sub-carriers can be multiplexed onto the optical beam, each of the sub-carriers providing digital information.

DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

The invention combines a dielectric waveguide to substantially losslessly confine an optical beam in a dielectric waveguide, the dielectric waveguide having a Stark material within. An electrode structure for providing an appropriate electrical field to the Stark material can be disposed outside the dielectric waveguide, rather than inside a vacuum enclosure and directly exposed to the optical beam as in conventional Stark designs, to produce Stark effect modulation.

In a preferred embodiment of the invention, ammonia gas fills a hollow waveguide and the light source is a $CO_2$ laser. For example, ammonia having an enriched concentration of deuterated ammonia ($NH_2D$), can fill a hollow dielectric waveguide tube and the light source can be the P(20) 10.59 $\mu$m line provided by a $CO_2$ laser. However, the invention is broadly applicable to modulation of light in general using a variety of Stark materials, the light preferably provided by a laser source. As used herein, "light" means not only signals in the spectrum of visible light, but also signals in the full spectrum of frequencies typically handled by optical transmission systems.

Figure 2:
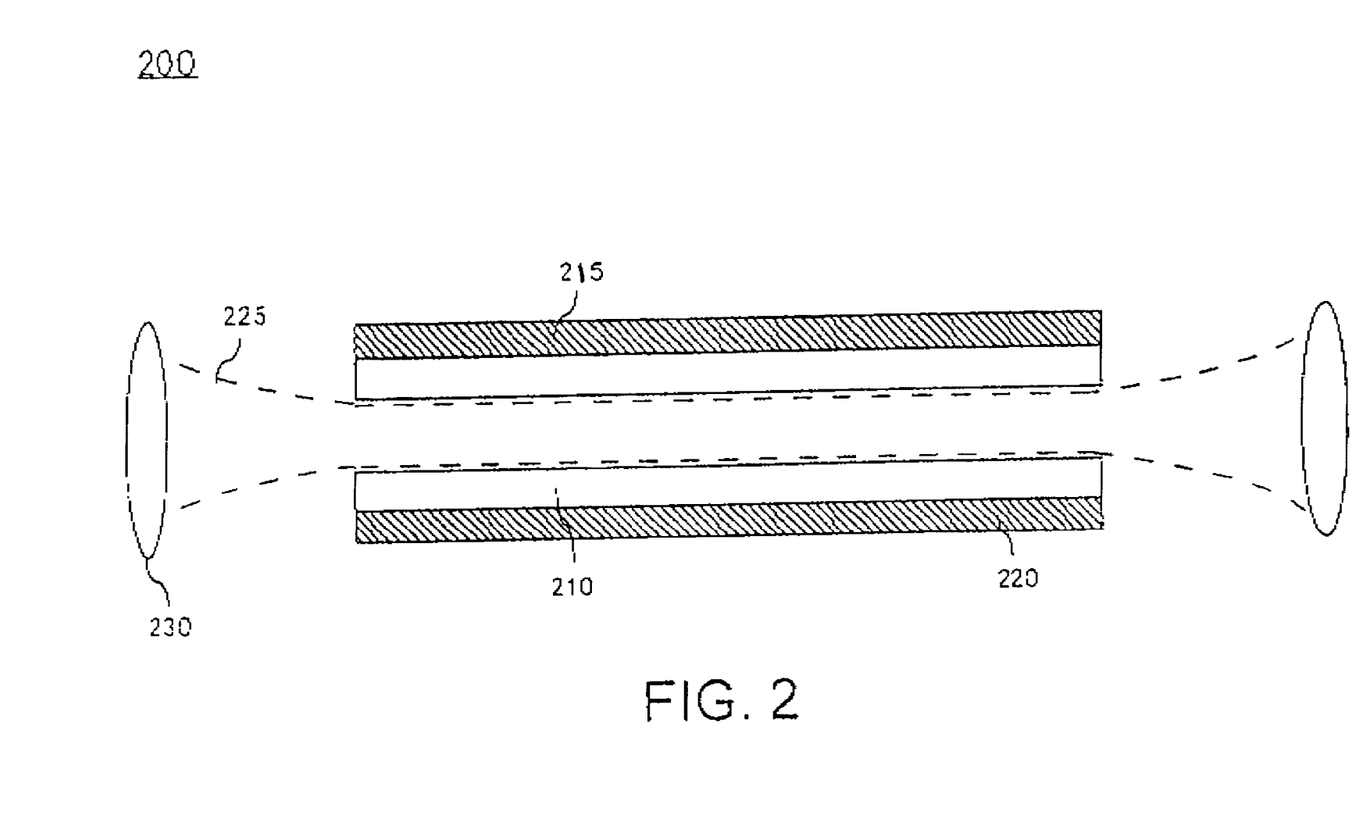
FIG. 2 illustrates a side view of a Stark modulator including a hollow dielectric waveguide for optical beam confinement, according to an embodiment of the invention.

Referring to FIG. 2, a side view of one embodiment of the invention is shown. Stark cell modulator 200 incorporates a hollow core dielectric waveguide 210 disposed between electrically conductive electrode plates 215 and 220, the waveguide structure for optically confining an incident optical beam 225 shown after being focused by lens 230.

The optical beam 225 is preferably a laser beam. In certain applications, the laser beam is linearly polarized. For example, when certain Stark gases are used, such as $NH_2D$, the polarization of the laser beam is selected such that the optical beam's electrical field is oriented perpendicular to the direction of the electrical field existing between the electrode plates of the Stark cell to satisfy the absorption selection rules for the $NH_2D$ Stark material.

In the embodiment shown in FIG. 2, the dielectric waveguide 210 forms all but the end plates of the vacuum enclosure. By using lens 230 to focus the laser beam 225 into the hollow dielectric optical waveguide core, at least approximately 95% of the optical power from an incident free-space Gaussian ($TEM_{oo}$) beam can be converted into a zero order Bessel function $EH_{11}$ dielectric mode in the dielectric waveguide 210. Coupling laser light into dielectric waveguides is described by Rick K. Nubling and James A. Harrington, "Launch Conditions and Mode Coupling in Hollow-Glass Waveguides", Opt. Eng. 37(9) 2454–2458 (September 1998), the entirety of which is hereby incorporated by reference into this application.

A structure for focusing the incident optical beam is preferably provided, such as a lens 230, the lens positioned so that the incident beam is focused such that the waist (w) of the resulting focused beam 225 divided by the waveguide bore radius (a) is equal to approximately 0.64. In a preferred embodiment of the invention, using a $CO_2$ laser beam emitting 10.59 $\mu$m light, the waveguide bore diameter is 1.0 mm nominally. However, satisfactory coupling performance may be obtained for a bore diameter as small as 500 $\mu$m (0.5 mm). The bore diameter is generally not a critical parameter.

However, a bore diameter of at least approximately 0.5 mm for 10 $\mu$m light is preferred because waveguide attenuation losses for 10 $\mu$m light generally increases as the bore diameter is reduced beyond approximately 0.5 mm. Shorter wavelengths can use a smaller bore diameter (<0.5 mm) before experiencing significant attenuation losses.

The waist ($\omega$) of a Gaussian beam is defined as the width of the Gaussian beam measured between respective $1/e_2$ intensity points, the peak beam amplitude at the beam center being normalized to an amplitude value of 1. The $EH_{11}$ dielectric mode propagates through the waveguide structure with negligible loss, in part, because a dielectric waveguide 210 is located between the electrodes 215 and 220. Thus, the laser beam 225 substantially avoids contact with the normally highly lossy metallic electrodes 215 and 220. This arrangement can be compared to conventional Stark cell designs, such as Stark modulator 100, which substantially vignettes the optical beam due to direct exposure of the optical beam with the electrodes.

The ends of the waveguide are preferably sealed with suitable end windows (not shown) to pass the laser beam 225 with minimum attenuation and reflection in the wavelength range of interest. End windows complete the vacuum enclosure permitting a Stark effect gas to be placed within the dielectric waveguiding structure and to be operated at low pressure. Typically, the gas pressure is set to a pressure of approximately 5 to 10 torr for most $CO_2$ laser applications.

Pressure can be an important design parameter. For example, the data rate of a Stark cell is theoretically limited by the pressure broadening in the gas. The pressure broadened line width of ammonia is about 32 MHZ/torr. Accordingly, to support a data frequency of 320 MHZ in a $CO_2/NH_2D$ system, the minimum cell pressure to support the above data rate is calculated to be at least 10 torr.

The combination of a beam isolated electrode design and the presence of a dielectric waveguide tube in conjunction with end windows to form a low-pressure Stark cell results in an electric field which is highly uniform. In addition, the smaller electrodes used generally require little or no overlap, and accordingly, result in lower plate capacitance compared to conventional free space designs. This permits use of higher modulation frequencies, permitting higher data rates to be supported. Thus, Stark modulator 200 optimizes optical transmission, minimizes the voltage required for good modulation efficiency and makes high-speed modulation possible.

In a preferred embodiment, a hollow core dielectric waveguide is used, the Stark material is ammonia substantially enriched with $NH_2D$ (hereafter $NH_2D$), and the light source is a $CO_2$ laser, the $CO_2$ line at approximately 10.59 $\mu$m being selected. In this embodiment, a DC bias can be applied to produce an electric field having a magnitude sufficient so that in combination with an applied AC modulation signal the electrical field can total at least approximately 380 V/mm at its maximum. It is known that an electrical field of approximately 380 V/mm is necessary to align a $NH_2D$ absorption line (M=±4) with the $CO_2$ line at 10.59 $\mu$m.

For example, lens 230 having a focal length of 50 cm may be used, the lens 230 located approximately 1.5 m from the Stark modulator 200. The various system components are preferably secured to a conventional laser table.

Using $NH_2D$ gas with a $CO_2$ laser, a 730 V DC bias may be used across a dielectric waveguide having a 0.5 mm bore and a 2.0 mm outer diameter, resulting in an electric field of 365 V/mm, assuming a uniform electrical field so that E=V/d applies, where E is the electrical field intensity, V is the voltage between the plates and d is the separation distance between the plates. In this embodiment, a 20–30 V RMS modulation signal may be used in combination with the bias signal to modulate the laser beam 225.

Use of reflective end plates with Stark modulator 200 to form a resonator can reduce the required length of the waveguide structure needed for a given modulation depth. However, the resulting frequency response of the Stark cell may be degraded due to signal delay resulting from the optical beam bouncing back and forth numerous times in the resonator.

Although the waveguide outer diameter used in the example above was 2.0 mm, the waveguide diameter can preferably be reduced to lower the required applied voltage, provided the waveguide remains structurally capable of withstanding the pressure gradient across the vacuum supported therein. Since the $EH_{11}$ mode essentially has zeros at the air/dielectric waveguide interface, thinning the waveguide thickness without affecting the bore radius will not generally subject the optical beam to the potentially lossy externally disposed electrodes 215 and 220.

Although the modulation method and apparatus described in this application can be applied to many different Stark materials and light sources, the description below will be limited to the interaction of a carbon dioxide ($CO_2$) laser source with a partially deuterated ammonia $NH_2D$), Stark gas. As noted above, $NH_2D$ is known to have a molecular absorption resonance line near the 10.59 μm line of emission of a $CO_2$ laser. The frequency difference between the absorption resonance of $NH_2D$ in the absence of an applied electrical field and the 10.59 μm $CO_2$ laser line is approximately 2.189 GHz.

Figure 3:
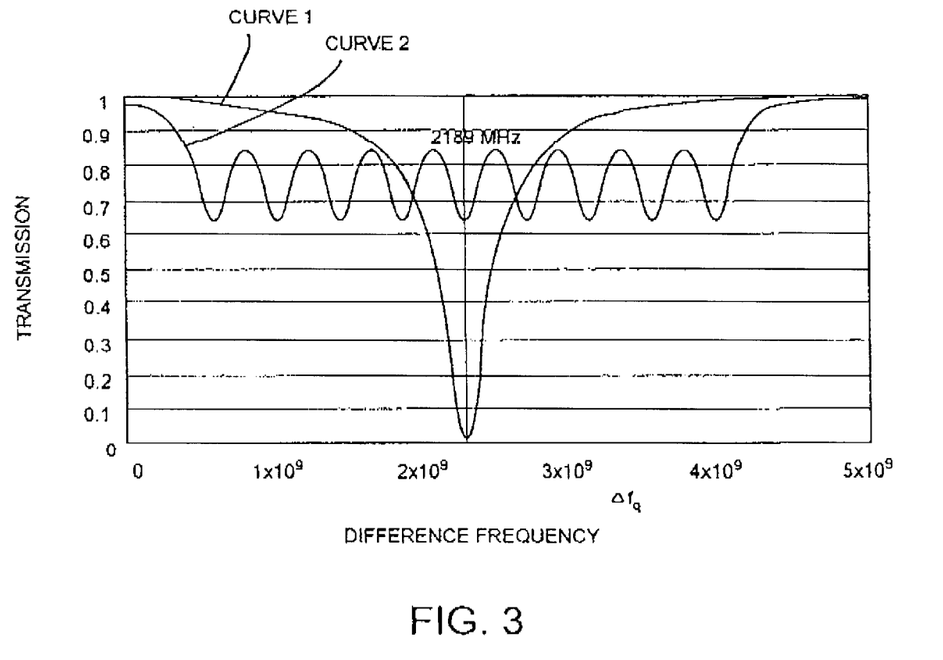
FIG. 3 illustrates the transmission characteristics of a 10.59 micron line from a $CO_2$ laser through a Stark cell filled with deuterated ammonia ($NH_2D$), plotted as a function of the frequency difference relative to the 10.59 micron line, with and without an applied electrical field.
Figure 4:
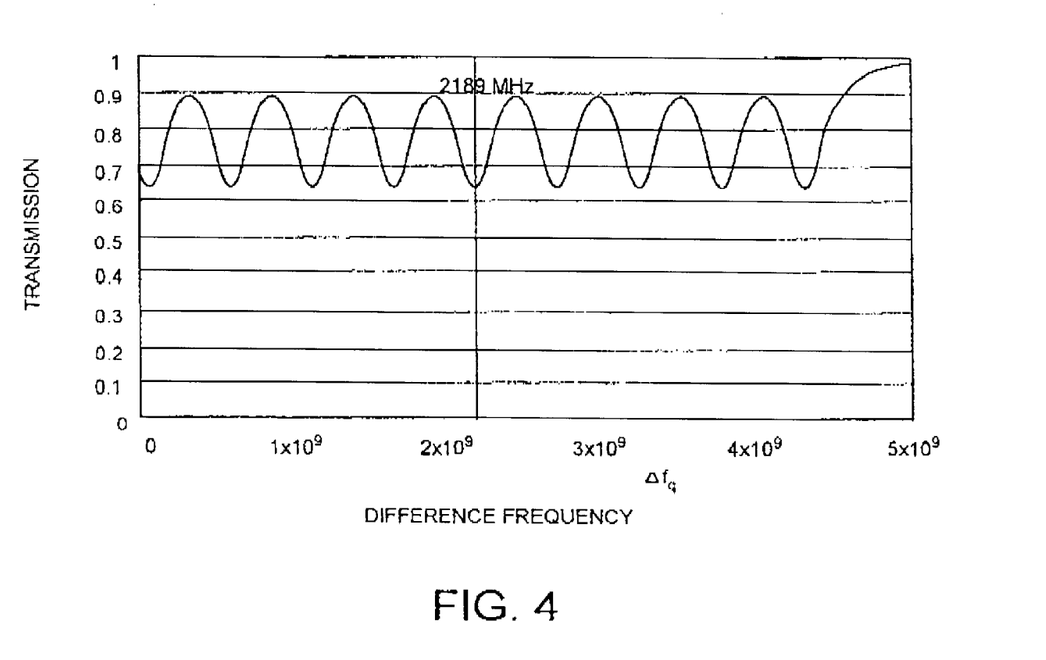
FIG. 4 illustrates application of a suitable electrical field to bring the $NH_2D$ absorption line into coincidence with the 10.59 micron laser line.

FIGS. 3 and 4 show light transmission through a 30 cm Stark cell having 2 torr $NH_2D$ gas disposed therein, the transmission being a function of applied electrical field. The voltage needed to produce a desired electrical field can be calculated from the outer diameter of the waveguide. Accordingly, curves based on electric field strength can be applied generally to any waveguide diameter.

Curve 1 shown in FIG. 3 depicts the transmission of the 30-cm long Stark cell without an applied electrical field. The $CO_2$ 10.59 μm laser line which is located at zero difference frequency on the x-axis shown is not strongly absorbed by the cell, showing a transmission percentage of approximately 98%.

Curve 2 shown in FIG. 3 shows the transmission of the same Stark cell in the presence of an applied electric field of 300 V/mm. The electric field causes,the single absorption line shown in curve 1 to split into nine Stark components classified by the designation M=0, ±1, ±2, ±3, and ±4. The M=0 component is roughly in the center of the plot at a difference frequency of 2.189 GHz and the M=±4 components are at the extreme left and right ends of the figure. As the electric field intensity is increased, the M=±4 absorption component moves closer to zero difference frequency until the peak of the absorption is coincident with the 10.59 μm $CO_2$ laser line corresponding to an electric field intensity of approximately 380 V/mm.

Referring now to FIG. 4, a 68% transmission from the 30 cm Stark cell occurs at the zero difference frequency, corresponding to the position of the 10.59 μm $CO_2$ laser line using an electrical field of approximately 380 V/mm. As the applied electric field is varied from 350 to 380 V/mm, the transmission of the 30-cm long Stark cell can vary from 88% (350 V/mm) to 68% (380 V/mm). The modulation index (fractional modulation) is not large for relatively short Stark cells. However, the modulation index can be improved by increasing the pressure of the Stark gas and increasing the length of the Stark cell. For example, if the length of the Stark cell is increased from 30 cm to 45 cm and the $NH_2D$ pressure is raised from 2 torr to about 6 torr, the modulation amplitude can exceed 70%.

If a steady state or DC voltage is applied to produce a constant electric field by applying a voltage across the electrodes half-way between 350 and 380 V/mm, or 365 V/mm, and applying an AC voltage (e.g. sinusoidal or square wave) with an amplitude of 30 V peak-to-peak, AC modulation of the laser beam will occur. As another example, modulation can also be achieved by setting a steady state electrical field of 350 V/mm and applying a 30 V square wave signal (0 to 30 V and 30 V to 0) to switch the transmission of the cell between the same 75% and 90% transmission states.

Figure 5:
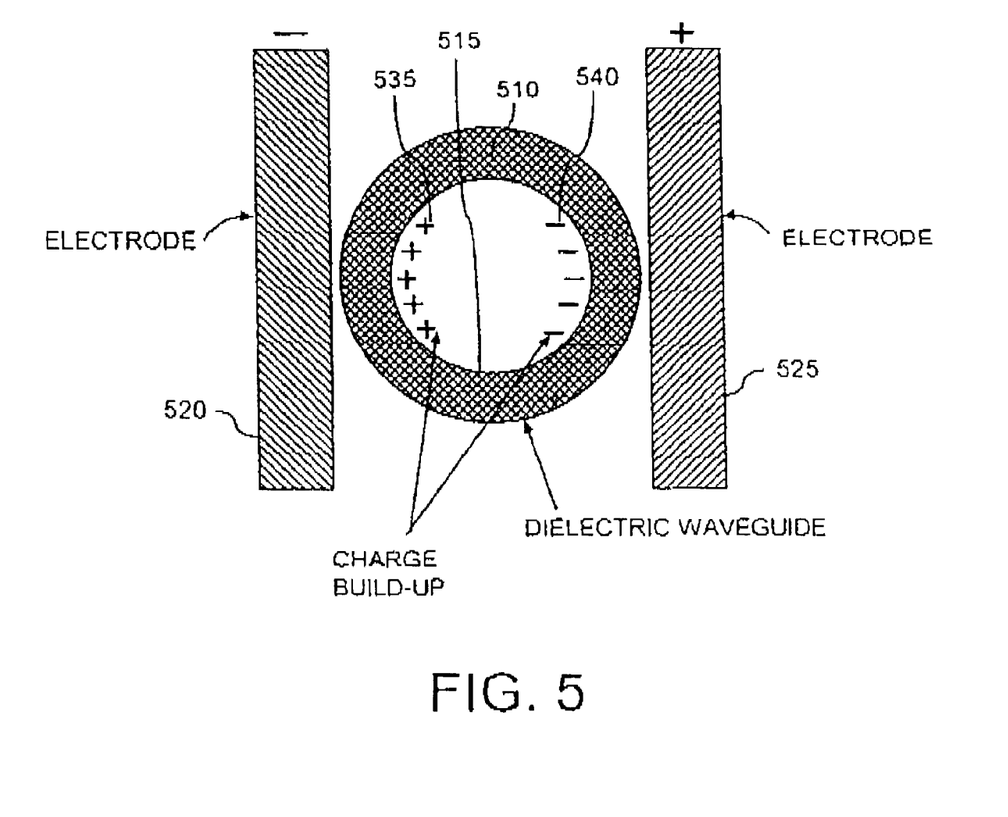
FIG. 5 illustrates an end view of the dielectric waveguide modulator shown in FIG. 2 showing charge build-up which can result on the walls of the waveguide tube.

Charge build-up can occur on the inner walls of the dielectric waveguide using a Stark cell utilizing certain dielectric waveguide materials with external electrodes. FIG. 5 illustrates an end view of dielectric waveguide modulator shown in FIG. 2 showing charge build-up on the inner walls 515 of the waveguide tube 510. When an electrical field is applied to the electrodes 520 and 525 as shown in FIG. 5, stray free electrical charges, such as ions and electrons in certain waveguide materials, can migrate to the side of the waveguide nearest the electrodes 520 and 525. Electrons 540 are attracted to the surface adjacent to the positively biased electrode 525 and positively charged ions 535 are attracted to the negatively biased electrode 520.

If present, charge build-up can reduce the electrical field across the Stark gas. Thus, charge build-up can result in inhibition of the modulation effect through electrical field reduction. In this case, the cell transmission would not generally change until the applied voltage is near the absorption peak (380 V/mm), the change occurring within a field of approximately 30–50 V/mm from the 380 V/mm absorption peak. If present, the modulation efficiency can be drastically reduced due to improper biasing resulting from charge build-up.

Initial laboratory measurements indicated that a time period of approximately 1 second was required for measurable charge build-up to occur using either a quartz or ceramic dielectric waveguide tube. Alternate dielectric materials are expected to have differing charge build-up characteristics. Some dielectric waveguide materials may not exhibit significant charge build-up effects. Others will have shorter charge build-up times, while other are expected to have longer charge build-up times, as compared to glass.

The rate of charge build-up is also expected to depend on pressure. It is generally difficult to predict the charge build-up rate theoretically. The charge build-up rate can be measured by varying the frequency of an applied AC biasing signal and observing the transmission characteristics of the Stark cell.

Because the charge build-up time for glass was found to require on the order of one (1) second to accumulate, a biasing circuit and method was designed to minimize or even eliminate the charge build-up effect and allow improved operation of the Stark modulator for waveguide materials which are subject to charge build-up during operation.

As noted above, for the deuterated ammonia line which is in near coincidence with the 10.59 micron $CO_2$ laser line, the selection rules for absorption require that the applied electric field be oriented perpendicular to the electric field of the optical beam. The polarity of the applied electrical field is not important, because the absorption for plus and minus respective M components are generally the same. For instance, if the electric field is applied with the higher potential imposed on the electrode 525 and the lower potential on electrode 520 shown in FIG. 5, or vice-versa, the transmission curves plotted in FIGS. 3 and 4 will not be changed.

Thus, absorption is proportional only to the magnitude of the electric field, not its direction, as long as the proper polarization relationship between the applied electrical field and the electrical field of the laser beam is maintained. Accordingly, the polarity of the bias voltage may be switched without substantially affecting operation of the Stark modulator, provided the rise and fall time of the bias waveform is relatively short.

In one embodiment, the charge build-up mitigating bias apparatus and method uses a bias source, at least a portion of which provides an alternating voltage polarity on the electrode plates of the Stark cell. In conventional electronic terminology, alternating current (AC) signals are produced when charge carriers in a conductor (or semiconductor) temporally reverse their direction of movement, sometimes, but not necessarily, periodically. As used herein, an AC waveform includes sinusoidal, triangular wave (sawtooth), square wave, as well as irregular or otherwise complicated polarity reversing waveforms.

The charge build-up mitigating bias used may entirely be an AC bias, preferably being a square wave signal. A square wave is preferred because during the constant portion of a square wave signal the signal level is constant, analogous to the level of a DC signal. The polarity switching is selected to be fast enough to at least substantially reduce, and preferably prevent, the charge build-up effect on the walls of the dielectric waveguide from occurring. For example, a circuit that generates a square wave signal having a frequency on the order of 100 to 1,000 Hz, or more, can be applied across the electrodes to overcome charge build-up in quartz which occurs in approximately one second.

Figure 6:
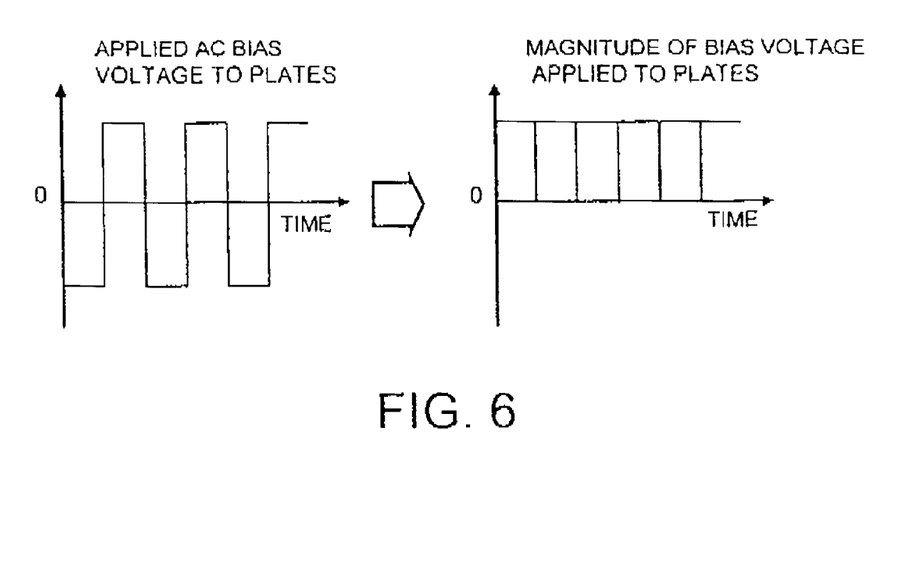
FIG. 6 illustrates how the application of a square wave across the electrode plates produces an effectively constant voltage magnitude across the same.

However, too high a frequency will reduce the data duty cycle due to finite amplifier slew rates, since data is not generally transmitted during bias level transitions. The waveform produced by this AC bias circuit is shown in FIG. 6. The applied square wave on the left produces a waveform that is analogous to a steady state DC bias magnitude across the plates as shown on the right of FIG. 6. As noted above, notwithstanding transient intervals, electrical field polarity reversals associated with the square wave do not generally affect operation of the Stark cell.

Figure 7:
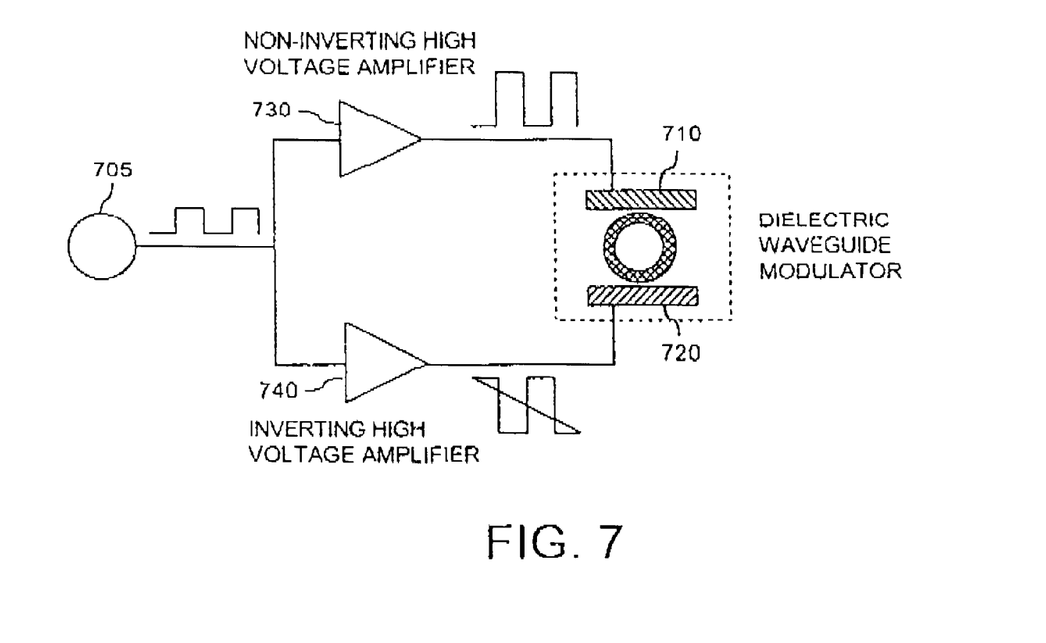
FIG. 7 illustrates application of out-of-phase bias waveforms to each of the electrode plates realized by providing a square wave input to a pair of high voltage amplifiers, one amplifier being an inverting amplifier and one being a non-inverting amplifier.

An AC bias voltage can be provided by a variety of available circuits. FIG. 7 shows such a bias circuit which includes a generator 705 and two amplifiers. An inverting amplifier 740 biases one electrode plate 720 and a non-inverting amplifier 730 biases the other electrode plate 710. Using this two amplifier arrangement, each amplifier is only required to produce half of the total voltage required across the electrodes. Although a two amplifier arrangement is shown in FIG. 7, a single amplifier may also be used with the invention for biasing provided the amplifier selected is capable of providing the full bias voltage required.

High voltage operational amplifiers may be used for this purpose. Since the signals output by the respective amplifiers 730 and 740 are configured to be 180° out of phase and the electrical field across the Stark gas is generated by a difference signal, the generator need only supply ½ the voltage necessary to bias the cell in the absence of use of a difference signal between two amplifiers 730 and 740. Amplifiers may be configured in a gain configuration (e.g. 30), to reduce the output voltage requirements for generator 705. If the amplifiers 730 and 740 are set in a gain of 30, for example, the minimum generator voltage can be reduced to 12.5 V.

Using a Stark modulator having a waveguide outer diameter of 2.36 mm, if a data waveform having a peak to peak amplitude of 150 V is provided (approximately 31.7 V/mm), the minimum required bias voltage is 750 V. Using two amplifiers, such as 730 and 740, with a differential signal taken across their outputs, each amplifier is required to supply 375 V. The 750 V bias voltage when combined with the data waveform produces a maximum combined voltage difference of 900 V across the electrode plates (380 V/mm).

Data may be added to the bias waveform, either in square wave pulses (hereinafter referred to as digital) or analog form. The amplitude of the data waveform is generally relatively small relative to the amplitude of the bias waveform.

Figure 8:
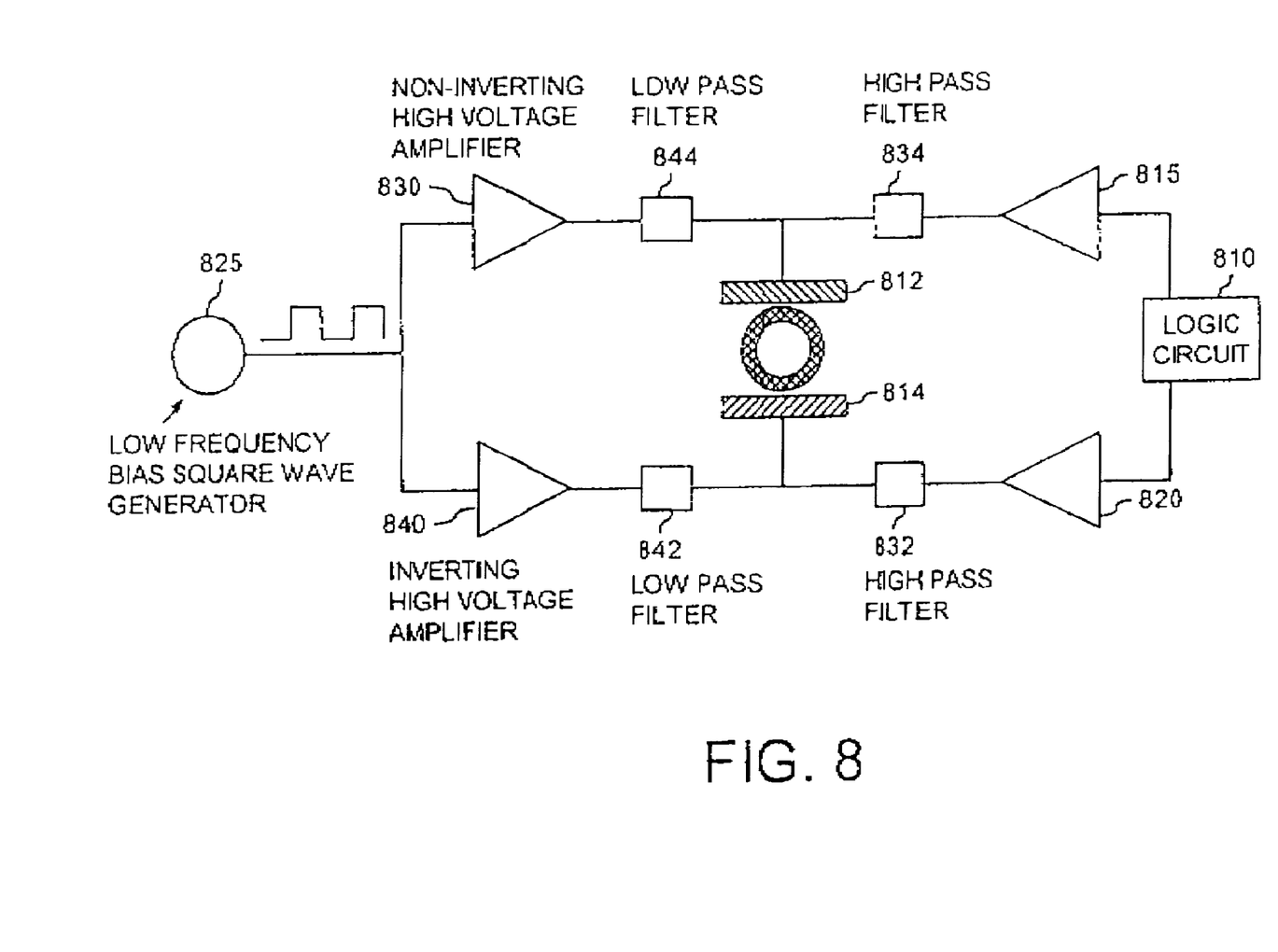
FIG. 8 illustrates a Stark cell system having circuitry for synchronizing data signals with a bias waveform.

A schematic of a combined bias/data amplifier system is shown in FIG. 8. A suitable logic circuit 810 drives a pair of high frequency amplifiers 815 and 820 with digital data signals to synchronize the polarity of the data waveform with that of the bias waveform. Although shown using two high frequency amplifiers 815 and 820, the invention may be practiced using a single high frequency amplifier to provide data signals. Although modulator performance would likely be compromised, it is possible that a single composite amplifier could provide both the bias and the data signals.

High frequency amplifiers 815 and 820 are preferably based on bipolar devices, due to their generally superior switching speed and current output capabilities compared to MOS devices. For example, in the $NH_2D/CO_2$ embodiment, amplifiers 815 and 820 should preferably provide at least a 15 V voltage swing with respect to ground. In a single high frequency amplifier embodiment, the high frequency amplifier selected would be required to provide at least a 30 v voltage swing.

High pass filters 832 and 834 can be provided to prevent coupling of the low frequency bias waveform into the data circuit. Preferably, the logic circuit 810 comprises a data buffer which can store data and delay transmission of the data waveform until the appropriate constant portion of the bias signal is present.

Figure 9:
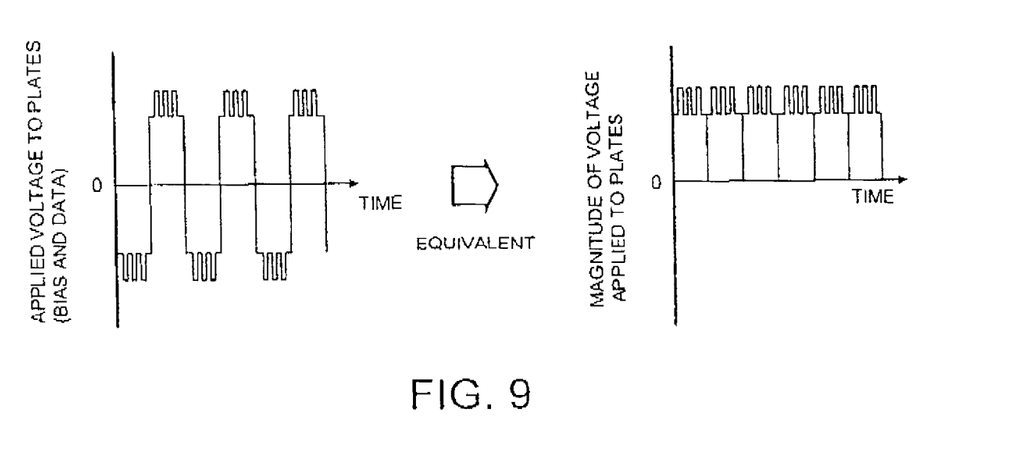
FIG. 9 illustrates resulting waveforms from the Stark cell system shown in FIG. 8 for the combined (bias and data) voltage across the electrode plates and the magnitude of the same.

The polarity of the data waveform preferably matches the polarity of the bias waveform to reduce the data voltage necessary to modulate the laser beam. For example, this relationship is shown in FIG. 9.

At a given time the bias voltages can produce a ±175 V/mm field resulting in a combined 350 V/mm field, the field pointing towards the electrode 814, resulting from high relative potential applied to electrode 812. While the field is pointing down, amplifier 815 can supply data in the form of digital pulses resulting in peak 15 V/mm fields and provide no field contribution when no data is present. At the same time, the same data stream, except inverted, can be applied to electrode 812, to produce a −15 V/mm peak field when data is present and no field contribution when no data is present.

As a result, when data is present, a 380 V/mm field results which produces maximum attenuation, while the absence of data results in a higher transmission level resulting from a 350 V/mm field. When the polarity of the bias waveform switches, the polarity of the respective data waveforms also reverses.

Analogous to the bias circuitry shown in FIG. 7, the bias waveform is produced by generator 825 and two amplifiers. An inverting amplifier 840 biases one electrode plate 814 and a non-inverting amplifier 830 biases the other electrode plate 812. Low pass filters 842 and 844 can be provided to prevent coupling of the high frequency data waveform into the bias circuit.

High voltage amplifiers, such as the Apex PA-95 high voltage power operational amplifier provided by Apex Microtechnology Tuscan, Ariz. have slew rates of approximately 1000 V/$\mu$sec. Low noise is also desirable in the amplifier selected. Assuming a bias voltage level of 500 volts and a bias frequency of 100 Hz, the switching transient using the above described amplifier will result in a duty cycle loss of only approximately 0.02%. The transition causes a 1 $\mu$sec loss due to the slew rate out of the half period of the 100 Hz square wave which has a duration of 5000 $\mu$sec, thus producing a duty cycle loss of only approximately 0.02%.

Figure 10:
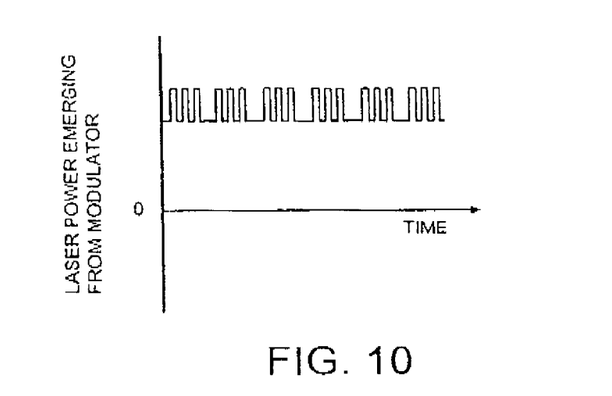
FIG. 10 illustrates modulated laser power emerging from the Stark cell system shown in FIG. 8.

Using the above described circuitry, the resulting waveform of power transmitted by the Stark modulator resembles the waveform shown in FIG. 10. As shown in FIG. 10, the composite power output waveform produced by the AC bias circuit combined with the data circuit shown in FIG. 8 appears identical to that which would be produced using a conventional DC bias voltage.

The description above related to the transmission of digital data. The invention can also be used to transmit analog data. Again using the $NH_2D/CO_2$ Stark modulator as an example, analog data using an RF sub-carrier may be generated by setting the bias to a level half way between the 350 V/mm level (low absorption) to the 380 V/mm level (maximum absorption), or at 365 V/mm. A high frequency signal can be added to this bias level with a 30 V/mm peak-to-peak amplitude to produce analog modulation.

The analog information can be based on the variation of amplitude, phase or frequency, or combinations thereof. The signal frequency could be chirped, going from low to high frequency, such a waveform being useful in laser radar. Many sub-carriers could be multiplexed into the waveform, each sub-carrier including different analog or digital information. Such sub-carrier modulation is commonly used in microwave and some high-frequency radio communications.

Appropriate selection of the optical beam source can improve performance of the invention in certain applications. It is known that atmospheric transport of optical beams can be improved through selection of less naturally abundant isotopes of atmospheric materials. Although the above description considered a Stark cell filled with $NH_2D$ provided with a beam from a $C^{12}O_2^{16}$ laser, various isotopes of this molecule can also be used. Various naturally occurring isotopes exist in reasonable quantities for both carbon and oxygen. For example, $C^{13}$ accounts for approximately 7% of all carbon atoms, the remainder generally being $C^{12}$. Accordingly, a $C^{13}O_2^{16}$ laser may be used as the optical beam source. By using $CO_2$ gas having enhanced levels of $C^{13}$, transmission characteristics through the atmosphere can be improved due to reduced interaction of the laser beam with the atmosphere, compared to $CO_2$ having a naturally occurring percentages of the various carbon isotopes.

Similarly, enhanced levels of $O^{16}$ and/or $O^{18}$ can be used either alone or in combination with enhanced levels of $C^{13}$ to further improve atmospheric transport of light output by a light source, such as a laser.

Using $C^{13}O_2^{16}$, the R(18) or the R(24) lines of the (00°1–10°0) vibrational band of a $C^{13}O_2^{16}$ laser may be modulated by Stark-tuned absorption resonances of $N^{14}H_3$. Electrical fields of about 654, about 787 and about 984 V/mm may be used to produce a coincident frequency condition to permit modulation of the above lines.

The invention is suitable for use with long range laser communication systems. For example, modulated beams can be used for free space optical links, such as building-to-building optical links carrying data spanning distances of 1,000 feet or more, allowing elimination of underground fiber-optic cables. In addition, the invention is expected to be useful for laser radar, chemical detection, target designation and active illumination for infrared imaging.

Laser radar requires modulation of a laser beam either by frequency modulation or amplitude modulation to measure a distance to a target using time delay. The Stark modulator described herein can produce amplitude modulation enabling laser radar by measuring the phase delay of the modulation envelope and computing the distance to a target.

Chemical detection and target designation may both be enhanced using an amplitude modulated laser beam. In chemical detection, the modulation is useful to enable phase-sensitive detection of a reflected signal that may be absorbed by a chemical in the atmosphere to improve sensitivity.

Target designators require the transmission of a coded laser beam to prevent an enemy from interfering with the target designation. Coding of the laser beam can also be useful when providing active illumination for infrared imaging. In this case, modulation can be used to enable phase-sensitive detection to improve sensitivity.

Individual components need not be formed in the disclosed shapes, or assembled in the disclosed configuration, but could be provided in virtually any shape and assembled in virtually any configuration. Further, the individual components need not be fabricated from the disclosed materials, but could be fabricated from virtually any suitable materials. Furthermore, all the disclosed elements and features of each disclosed embodiment can be combined with, or substituted for, the disclosed elements and features of every other disclosed embodiment except where such elements or features are mutually exclusive.

We claim:

1. An optical modulator, comprising:
    a dielectric waveguide for receiving an optical beam and coupling energy of said optical beam into a dielectric material comprising said waveguide which surrounds, said optical beam being at a first frequency;
    at least one Stark material disposed in said waveguide, said Stark material having at least one absorption frequency that is electrostatically tunable within a range of frequencies, said range of frequencies including said first frequency;
    a bias circuit for generation of a bias electrical field across said Stark material to shift at least one of said absorption frequencies towards said first frequency, and
    a circuit for producing a time varying electrical field across said Stark material, said time varying field being adapted to shift at least one said absorption frequencies towards said first frequency and away from said first frequency.

2. The optical modulator of claim 1, further comprising conductive electrodes disposed outside of said waveguide, whereby said waveguide isolates said optical beam from said electrodes.

3. The optical modulator of claim 1, further comprising a $CO_2$ laser for producing said optical beam, wherein said Stark material is ammonia.

4. The optical modulator of claim 1, wherein said ammonia comprises ammonia having an enhanced concentration of deuterated ammonia ($NH_2D$).

5. The optical modulator of claim 1, wherein said waveguide has a bore size of less than 1.0 mm.

6. The optical modulator of claim 1, wherein substantially all incident power of said optical beam is coupled into an $EH_{11}$ mode in said waveguide.

7. The optical modulator of claim 1, wherein said optical beam is linearly polarized and oriented perpendicular with respect to said electrical fields.

8. The optical modulator of claim 1, wherein at least a portion of said bias field is an alternating field component.

9. The optical modulator of claim 8, wherein said alternating field component is generated by a square wave signal.

10. The optical modulator of claim 8, wherein said alternating field component has a frequency sufficient to switch polarity faster than the rate of charge build-up on walls of said waveguide.

11. The optical modulator of claim 8, wherein said waveguide is quartz and a frequency of said alternating field component is at least 100 Hz.

12. The optical modulator of claim 11, wherein substantially all of said bias field is an alternating field.

13. The optical modulator of claim 1, wherein said bias circuit comprises two amplifiers, said bias amplifiers configured to produce outputs having opposite polarities in response to a given input signal.

14. The optical modulator of claim 1, wherein said circuit for producing a time varying signal comprises two high frequency amplifiers, said high frequency amplifiers configured to produce outputs having opposite polarities in response to a given input signal.

15. The optical modulator of claim 8, further comprising a structure for synchronizing the polarity of said time varying electrical field with said alternating field component.

16. The optical modulator of claim 1, wherein said circuit for producing a time varying electrical field generates at least one analog data component.

17. The optical modulator of claim 16, wherein said analog data component is transmitted with said optical beam by variation of at least one optical beam parameter selected from the group consisting of amplitude, phase and frequency.

18. The optical modulator of claim 16, wherein said analog data component comprises a chirped signal, said chirped signal varying over a frequency range.

19. The optical modulator of claim 16, wherein said at least one analog data component comprises a plurality of sub-carriers, said plurality of sub-carriers multiplexed onto said optical beam, wherein each of said sub-carriers provide analog information.

20. The optical modulator of claim 1, wherein said circuit for producing a time varying electrical field generates at least one digital data component.

21. The optical modulator of claim 20, wherein said at least one digital data component comprises a plurality of sub-carriers, said plurality of sub-carriers multiplexed onto said optical beam, wherein each of said sub-carriers provide digital information.

22. A method for processing a modulated optical signal which comprises utilizing the apparatus of claim 1, wherein said utilizing includes at least one selected from the group consisting of a free-space optical link, laser radar, chemical detection, target illumination and active illumination for infrared imaging.

23. A method of modulating optical signals, comprising the steps of:
providing a dielectric waveguide for receiving an optical beam and coupling energy of said optical beam into a dielectric material comprising said waveguide which surrounds, said waveguide having at least one Stark material disposed therein, said Stark material having at least one absorption frequency that is electrostatically tunable within a range of frequencies;
coupling said optical beam into said waveguide, said optical beam being at a first frequency, said first frequency within said frequency range; and
applying an electric field having including a time varying field portion across said Stark material, wherein said optical beam output by said waveguide is modulated by said time varying portion of said electrical field.

24. The method of claim 23, wherein said optical beam is provided by a $CO_2$ laser and said Stark material is ammonia.

25. The method of claim 24, wherein said ammonia comprises ammonia having an enhanced concentration of deuterated ammonia ($NH_2D$).

26. The method of claim 23, wherein said coupling step comprises transferring substantially all incident power of said optical beam into an $EH_{11}$ mode in said waveguide.

27. The method of claim 23, wherein said applying step comprises providing a bias electrical field across said Stark material, at least a portion of said bias field comprising an alternating field component.

28. The method of claim 27, wherein said alternating field component is generated by a square wave signal.

29. The method of claim 27, wherein said alternating field component has a frequency sufficient to switch polarity faster than the rate of charge build-up on walls of said waveguide.

30. The method of claim 27, wherein said waveguide is quartz and a frequency of said alternating field component is at least 100 Hz.

31. The method of claim 30, wherein substantially all of said bias field is an alternating field.

32. The method of claim 27, wherein said bias field is generated by a differential signal, components of said differential signal having opposite polarities.

33. The method of claim 27, further comprising the step of synchronizing the polarity of said time varying electrical field with said alternating field component.

34. The method of claim 23, wherein said time varying electrical field portion is generated by at least one analog-data signal.

35. The method of claim 34, wherein said analog data signal is transmitted with said optical beam using variation of at least one optical beam parameter selected from the group consisting of amplitude, phase and frequency.

36. The method of claim 34, wherein said at least one analog data signal comprises a plurality of sub-carriers, said method further comprising the step of multiplexing said plurality of sub-carriers onto said optical beam, wherein each of said sub-carriers provide analog information.

37. The method of claim 23, wherein said time varying portion is generated by at least one digital data signal.

38. The method of claim 37, wherein said at least one digital data signal comprises a plurality of sub-carriers, further comprising the step of multiplexing said plurality of sub-carriers onto said optical beam, wherein each of said sub-carriers provide digital information.

* * * * *